No. 669,670. Patented Mar. 12, 1901.
E. THOMSON.
ELECTRICAL MEASURING INSTRUMENT.
(Application filed June 25, 1900.)
(No Model.)
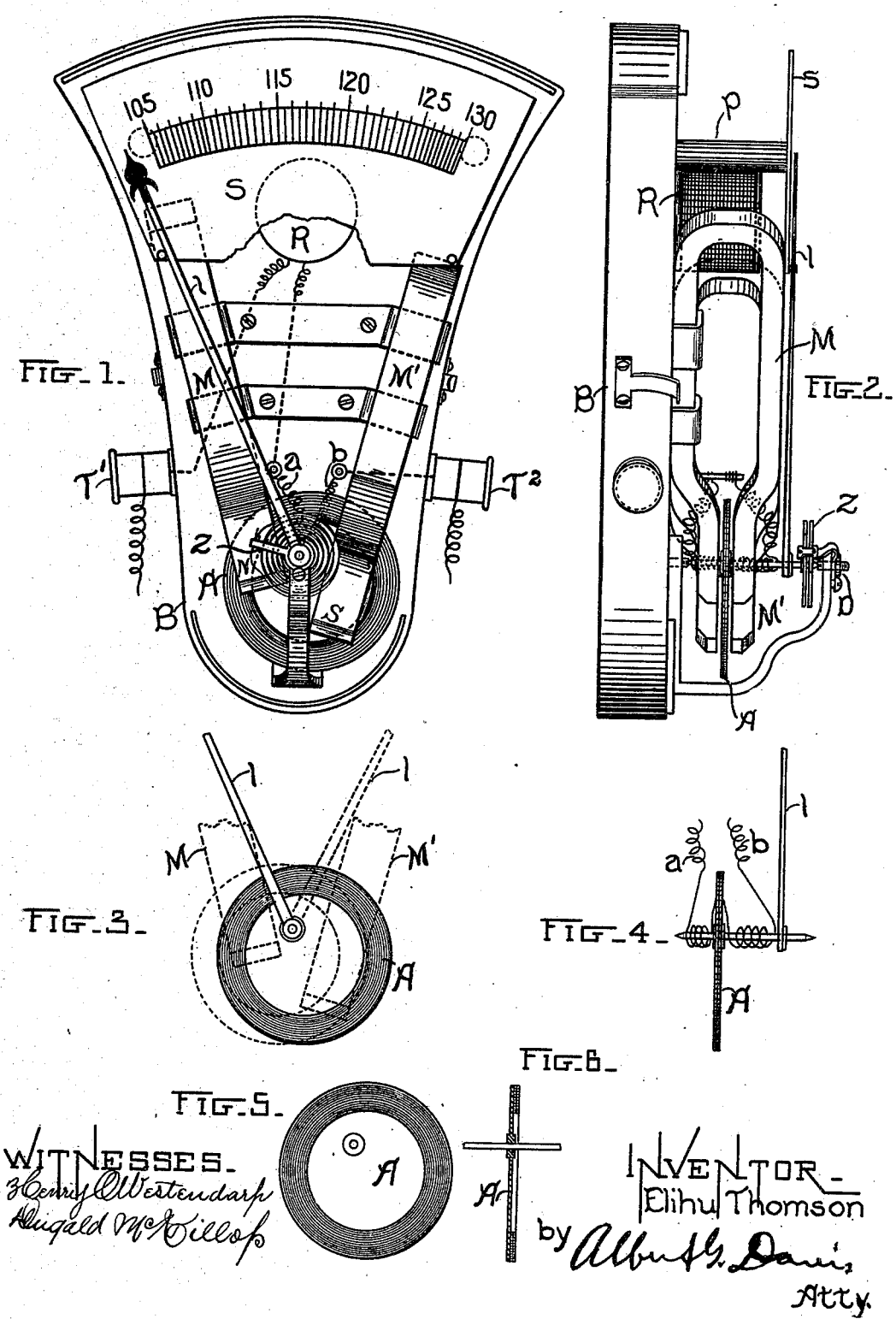
WITNESSES.
Henry Westendarp
Dugald McGillop
INVENTOR.
Elihu Thomson
by Albert G. Davis
Atty.

UNITED STATES PATENT OFFICE.

ELIHU THOMSON, OF SWAMPSCOTT, MASSACHUSETTS, ASSIGNOR TO GENERAL ELECTRIC COMPANY, OF NEW YORK.

ELECTRICAL MEASURING INSTRUMENT.

SPECIFICATION forming part of Letters Patent No. 669,670, dated March 12, 1901.

Application filed June 25, 1900. Serial No. 21,445. (No model.)

*To all whom it may concern:*

Be it known that I, ELIHU THOMSON, a citizen of the United States, residing at Swampscott, county of Essex, State of Massachusetts, have invented certain new and useful Improvements in Electrical Measuring Instruments, (Case No. 1,702,) of which the following is a specification.

My present invention relates to electrical measuring instruments, the object being to simplify and cheapen their construction and render them more compact than as commonly constructed. The question of room is one which is particularly important in instruments such as ampere-meters and voltmeters mounted on switchboards of lighting, power, or other distributing stations. The instruments employed in this class of service are commonly provided with wide scales, to accommodate which the casing must have a considerable lateral extent, thereby occupying considerable space on the board. It is not, however, essential in the case of most instruments so employed that a wide angle should be subtended by the scale-markings, since the function of the instruments is frequently to indicate a comparatively narrow range of deflection above and below a certain critical potential or current strength which it is imperative or desirable to maintain in the system. In systems designed to distribute current at one hundred and ten volts, for example, the range of fluctuations of the voltmeter will be only a few volts on either side of the scale-marking corresponding to "110." One of the features of my invention is to take advantage of this condition and use a scale-plate having a narrow angle calibrated for a certain range on either side of ordinary commercial voltages. The parts of the instrument are arranged so that no part of the casing will occupy a greater space than that required to accommodate the scale-plate. To this end the controlling-magnets are supported along the sides of the instrument lying at an angle to each other, and the moving system carrying the index needle or pointer is pivotally supported in coöperative relation to the field of these magnets.

In order to produce a compact construction and provide as dense as possible a magnetic field in which the moving system may play, I employ flat or pancake coils which may with advantage be mounted upon a thin aluminium or other conductive disk, by which sudden movements of the pointer may be dampened. I mount the coil of the moving system, which may be of any desired shape, in such a way that the axis of the magnetic field developed by current flowing through the coil will be eccentric, or at least asymmetric, to the stationary field of force which assists in the development of the torque. I preferably employ two fixed magnets so arranged with reference to their poles that one will develop repellent force and the other an attractive force upon the polar axis of the coil when magnetized, and while this duplex magnetic arrangement is not inoperative it is desirable for the reason above noted, as well as because it lends to the organization the advantage of freeing it to a certain extent from interference by other circuits on the switchboard or in the neighborhood of the instrument, since it permits me to arrange the poles of the two magnets in reverse order with respect to the coil, thus cutting down in one magnet the amount of disturbance due to the external circuit in exactly the same measure as it is aggravated in the other. Thus the instrument is rendered in what I call a "semiastatic" condition. The coil itself is not astatic, but by the arrangement just noted of the magnets the disturbance of outside circuits or fields of force is measurably counterbalanced.

The novel features of my invention will be hereinafter more particularly described and will be definitely indicated in the claims appended to this specification.

In the accompanying drawings, which illustrate an embodiment of my invention, Figure 1 is a plan view with the cover removed of an instrument embodying my improvements. Fig. 2 is a side elevation. Fig. 3 is a diagram illustrating the action of the instrument. Fig. 4 is a detail view of the movable system, and Figs. 5 and 6 are a plan and a medium cross-section of the movable element.

The arrangement of the instrument will be easily understood from an examination of Figs. 1 and 2. It will be noted that the scale is calibrated only for the upper range of deflections. The particular instrument shown in the drawings is a voltmeter, though, of course, it will be understood that my invention is equally applicable to ampere-meters. The scale in the instrument shown in the drawings starts at "105" and terminates at "130." This instrument would be entirely serviceable for a system designed to carry, say, one hundred and fifteen volts and would indicate deflections above or below this limit, and since in central-station practice it is imperative to prevent any wide fluctuation beyond the nominal voltage of the system a scale of this character is perfectly adapted. The scale-plate (see Fig. 2) is mounted upon a post P, secured to a base B, which may be of metal or wood or any other suitable supporting material, and a pointer I, controlled by the movable element, is arranged to sweep over this scale. The pointer is fixed to an axis on which is mounted a pancake-coil A, which constitutes an armature for a pair of permanent magnets M M'. The coil is shown circular, though this is not at all essential, since it may have any desired configuration and by changes in its shape may be adapted to change the character of calibration, so as to make all of the scale uniform in its readings or make one part with wider readings than another. In an instrument for switch-board-work it is desirable to have the readings more open at or near the point at which the needle normally stands, and as a circular coil is well adapted to effect this result in an instrument of the type involved in my present invention I have shown in the drawings a circular coil, and as will be noted the scale-markings are more open toward the center of the scale or the point at which the needle would normally stand, thereby permitting any aberration from this position to be the more readily observed. I prefer to mount the pancake-coil upon a metallic disk and have so shown it in the drawings. A coil on each side of the disk may be employed, if desired. For voltmeters this disk would be made of a light metal, such as aluminium, so as to increase as little as practicable the momentum of the system under a change of torque, and thereby permitting the pointer to come to rest more quickly by the dampening action of the Foucault currents developed in the disk.

The coil-terminals may be given a number of turns in the form of a helix around the axis of the movable element and then led out to two fixed terminals $a$ $b$, from which the connections may be made to circuit-terminals $T'$ $T^2$, a resistance R in the case of a voltmeter being interposed in the circuit so as to cut down the current. The zero-seeking tendency may be provided by a weight or magnetic needle or spring, as desired. In the drawings I have shown a pair of long spiral springs Z, mounted on an adjustable arm for varying its tension after the manner commonly employed in the construction of hair-springs in watches. The axis of the movable system may be mounted in jewel-bearings, as common in the construction of electrical measuring instruments, the lower one being carried in a plate and the upper one in a bracket, forming part of this plate, as indicated at D. The leads taken from the coil to the fixed posts $a$ $b$ should be very flexible, so as to offer but little opposition to the torque of the movable element. In a voltmeter it may be made of thin wire of a good conductor, and the manner I have shown in Fig. 4 of coiling it about the axis of the movable element gives it increased flexibility and reduces the amount of its opposition to the torque. The magnets M M' may be mounted in fixed clips secured to the base and are set at an angle conforming more or less to the sides of the casing, thereby rendering them perfectly independent of one another and reducing the magnetic leakage across the gap. Their polar ends are approximated by bending down the metal of the magnets, as indicated in Fig. 2, so as to bring them quite close to each other, thus forming a dense magnetic field. The poles of the two magnets are arranged in reverse order with respect to a plane cutting the coil of the movable element—that is to say, if the magnet M be mounted so that its north pole faces the observer looking at Fig. 1 the south pole of magnet M' would face the observer. Thus in any external magnetic field, as from a neighboring conductor carrying heavy electric currents or neighboring instruments, if the stray field of force be in such a direction as to augment the effect of one magnet it would correspondingly diminish that of the other, thereby rendering the measuring instrument astatic so far as its field of force is concerned. Inasmuch as these stray fields, however, would cut also the coil of the movable element the instrument is not perfectly astatic, and may therefore be denominated "semi-astatic." The mechanical axis of the moving coil is eccentric to its polar axis which lies between the fields set up by the magnets M and M', and since these two fields are opposite in direction in respect to their magnetic potentials one will repel while the other attracts the field developed by the coil. This arrangement also conduces to the style of calibration shown in Fig. 1, which, as hereinbefore pointed out, is desirable for a central-station instrument by reason of the open character of the readings at the normal position of the pointer, and this will follow the arrangement of the magnets just described. The position of the moving system at zero and maximum deflection is indicated in Fig. 3, the position of the pointer I in full lines indicating the position on open circuit and in dotted lines when the instrument is deflected. Stops, as indicated in Fig. 1, may be provided to arrest the needle at the zero position and the position of maximum deflection.

The instrument may be converted into an ammeter, as is well known, by shunting the armature by a definite low resistance.

What I claim as new, and desire to secure by Letters Patent of the United States, is—

1. An electric measuring instrument having its movable element controlled by a coil supported eccentrically in a magnetic field.

2. An electric measuring instrument having its movable element controlled by a coil supported eccentrically in a magnetic field in combination with a damping device.

3. An electric instrument having its movable element controlled by a measuring-coil supported eccentrically in a magnetic field.

4. An electric measuring instrument having a fixed field-magnet provided with closely-adjacent poles, a flat coil eccentrically pivoted for movement between the poles, and connections for leading current to and from the coil.

5. An electric measuring instrument having a fixed field-magnet, a coil eccentrically mounted with relation to the field, the polar axis of the coil when the circuit is open lying between field-poles of unlike sign.

6. An electric measuring instrument having a fixed field-magnet, a circular pancake-coil eccentrically mounted in a narrow gap in the magnetic field, the sweep of the coil being between poles of unlike sign.

7. An electric measuring instrument having a magnetic field comprising a plurality of pairs of poles arranged in reverse order to counteract the effect of external fields, and a movable measuring-coil eccentrically mounted with relation to the several poles of the field.

8. An electric measuring instrument having a compound magnetic field formed of two magnets set at an acute angle, the poles being relatively reversed with respect to the movable element, and a measuring-coil having its axis pivoted in a plane between the two polar fields.

9. An electric measuring instrument having a compound magnetic field formed of two permanent magnets inserted at an acute angle, with their poles relatively reversed with respect to the movable element, and a measuring-coil pivotally supported within both fields, its axis being eccentric to each of said fields.

10. An electric measuring instrument having a compound magnetic field formed of two magnets set an an acute angle, the poles being relatively reversed with respect to the movable element, and a measuring-coil secured to the moving element pivoted in eccentric relation within said fields, the moving element being normally under tension, and a scale-plate having its minimum indication a determinate range above unity corresponding to the tension of the movable element.

In witness whereof I have hereto set my hand this 22d day of June, 1900.

ELIHU THOMSON.

Witnesses:
DUGALD MCKILLOP,
HERMANN LEMP.